Feb. 11, 1964 K. BELL 3,120,703
PRINT FORMING APPARATUS
Filed May 24, 1961 2 Sheets-Sheet 1
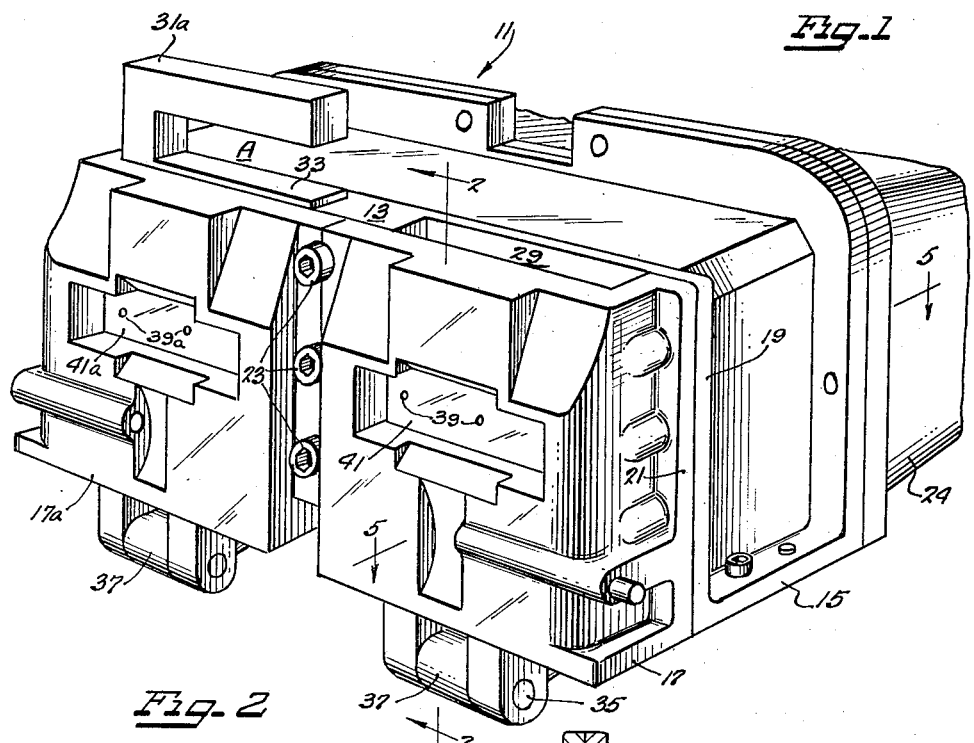
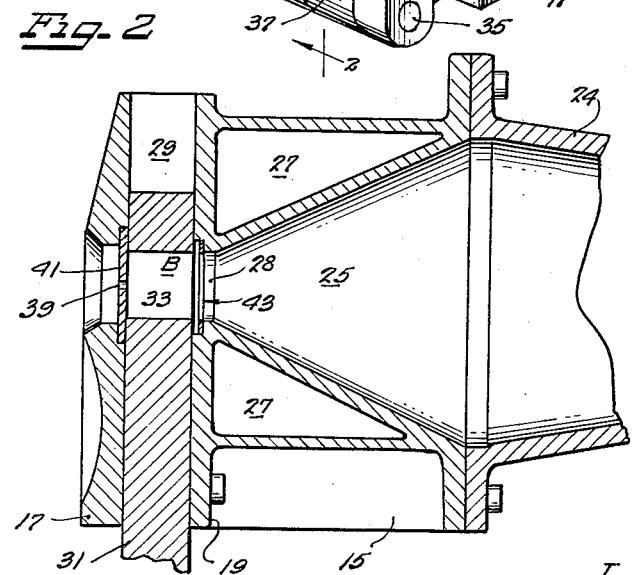
Inventor
KENNETH BELL
By Soans, Anderson,
Luedeka & Fitch
Attys Feb. 11, 1964 K. BELL 3,120,703
PRINT FORMING APPARATUS
Filed May 24, 1961 2 Sheets-Sheet 2
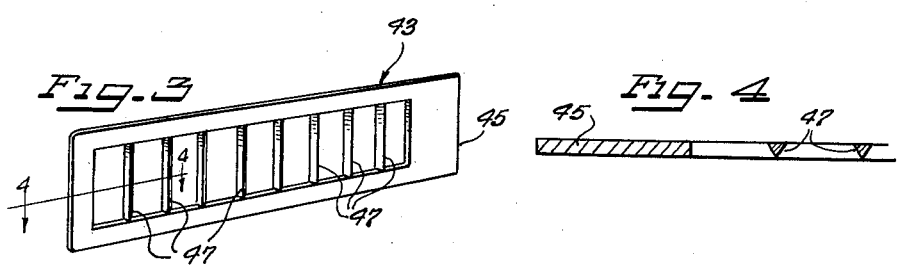
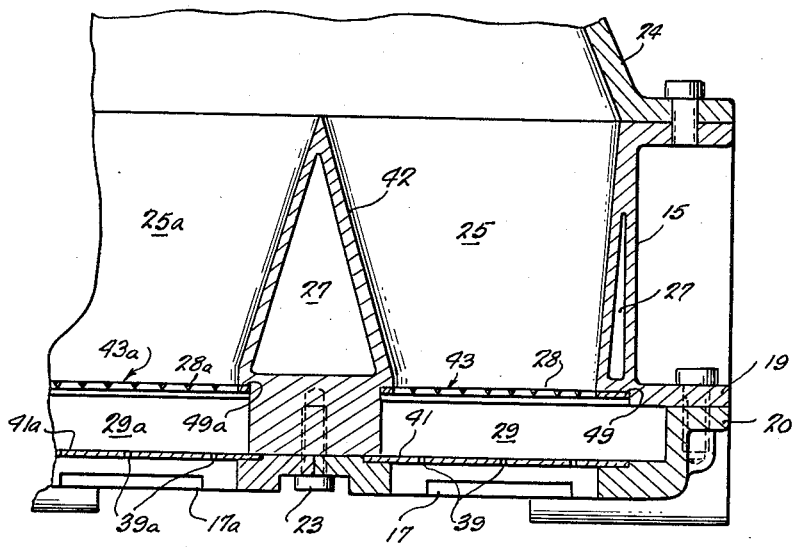
Inventor
KENNETH BELL
By Soans, Anderson,
Luedeka & Fitch
Attys United States Patent Office 3,120,703
Patented Feb. 11, 1964

3,120,703
PRINT FORMING APPARATUS
Kenneth Bell, Marengo, Ill., assignor to National Dairy Products Corporation, New York, N.Y., a corporation of Delaware
Filed May 24, 1961, Ser. No. 112,263
1 Claim. (Cl. 31—8)

The present invention relates generally to print forming apparatus used in connection with the packaging of edible plastic materials. More particularly, the present invention relates to print forming apparatus used in connection with the packaging of whipped butter or margarine.

High speed forming and wrapping of prints of margarine is carried out on print forming machines which have become relatively standard throughout the margarine industry. Such machines form the margarine into rectangular blocks, or prints, which usually comprise one-quarter pound of material. One such machine is that which is sold by Lynch Package Machinery Corporation of Toledo, Ohio, under the trade name "Morpac."

Whipped edible plastic materials, such as whipped butter or margarine, are currently enjoying an increasing market demand. (As used in this specification, the term "whipped plastic materials" includes butter, margarine, or similar products which have been beaten with incorporation of air, nitrogen, or other gases.) Such whipped plastic materials have desirably improved spreadability and other properties. One process for the preparation of such whipped plastic materials is that disclosed in United States Letters Patent No. 2,774,578 to Spiess et al. In accordance with this process, the plastic material is whipped in the presence of gas, without melting to fluid condition.

Attempts to form prints of whipped plastic materials without melting to fluid condition on conventional equipment have heretofore resulted in poor print formation and control of the weight of the finished print. In this connection, because whipped plastic materials include incorporated and some unincorporated gas, these materials, when formed in printing molds, have varied in form and weight. In this connection, there would be voids on and in the print which not only occasion the above-described problems of weight control, but also give the print an undesirable, if not unsightly, appearance.

Accordingly, it is a primary object of the present invention to provide improved print forming means for whipped plastic materials. Another object of the present invention is to provide means for effecting the printing of whipped plastic materials in a print forming machine. More specifically, it is an object of the present invention to provide means for effecting the printing of whipped plastic materials in a print forming machine whereby effective form and weight control of the prints is obtainable. An additional object of the present invention is to provide means for whipping, handling, and printing butter or margarine without melting thereof, the resulting print having uniform density and being substantially free from voids. Other objects and advantages of the present invention will become apparent from the following description and drawings, in which:

FIGURE 1 is a perspective view of a print forming unit embodying the features of the present invention;

FIGURE 2 is an enlarged sectional view taken along line 2—2 of FIGURE 1;

FIGURE 3 is an enlarged perspective view of a grid which forms part of the unit shown in FIGURE 1;

FIGURE 4 is a fragmentary sectional view taken along line 4—4 of FIGURE 3; and

FIGURE 5 is an enlarged fragmentary sectional view taken along line 5—5 of FIGURE 1.

With reference particularly to FIGURE 1 of the drawings, it will be seen that apparatus chosen to illustrate the present invention comprises a print-forming unit 11 which is particularly adapted for the making of rectangular prints of whipped plastic material. Whipped plastic material, which may be prepared without melting of the material as disclosed in United States Letters Patent No. 2,774,578, is pumped under pressure or otherwise suitably fed into the unit, where it is molded into rectangular prints and then ejected from the unit for wrapping and packaging.

Generally, the print-forming machine 11 comprises a main housing 13, which is preferably made of a plurality of sections, suitably secured together, to facilitate dismantling of the machine for cleaning and servicing. In the illustrated embodiment, the main housing 13 includes a feeding section 15 and two print forming sections 17 and 17a.

It will be noted that the unit in the drawings is adapted to form a pair of prints, with two print-forming means which are substantially identical. Accordingly, the apparatus will be particularly described with reference to a single print-forming means, with the corresponding elements on the other print-forming means being identified by the same numerical designation followed by the postscript "a."

The feeding section 15 and the print-forming section 17 have flanged portions 19 and 21 which are bolted or otherwise detachably joined. The feeding section is further joined to the print-forming section at the middle joint by additional bolts 23.

Whipped plastic material is supplied to the unit 11 through suitable conduit means 24 to the feeding section 15 of the main housing 13.

The feeding section 15 of the main housing 13 includes an inlet passageway 25 for conducting the whipped plastic material (FIGURES 2 and 5), and the inlet passageway is provided with surrounding water passages 27 for circulation of heated water therethrough, in order to maintain the temperature of the walls of the passageway sufficiently high to facilitate flow of the whipped plastic material under the operating pressure. The passageway 25 tapers toward an opening 28 through which the plastic material is fed into the print-forming section 17. The opening is generally rectangular in shape, the rectangle having sides having the same lengths as one dimension of the print to be formed.

The print-forming section 17 is provided with a transversely and vertically extending channel 29 (FIGURES 2 and 4) in which is slidably received a generally rectangularly shaped print former 31 which comprises the mold for forming prints of predetermined shape and volume. The print former 31 is vertically disposed in the housing 13 and has an opening 33 formed therein, which with the walls of the channel 29 define a mold of the size and shape of the print to be formed. The print former 31 moves up and down in the channel 29 between a print delivering position shown at A in FIGURE 1 and a filling position shown at B in FIGURE 2. In the filling position, the opening 33 aligns with the opening 28 from the passageway 25. The lower end of each print former 31 is suitably connected, as by a pin 35 (FIGURE 1), with an actuating lever 37, which in turn is suitably connected with powered drive means (not illustrated) to provide timed vertical reciprocal movement of the print former 31 in the channel 29.

As above indicated, the opening 33 in the print former 31 provides a print-forming chamber, and is alignable with the passageway 25. In this position, the opening 33 in the die block is filled with whipped plastic material flowing through the opening 28 from the inlet passageway 25, and the print former 31 is then moved upwardly to position A above the main housing. The formed print of whipped plastic material in the opening 33 may thereupon be ejected by suitably timed ejector means (not illustrated) for subsequent wrapping and packaging. The print former 31 is then retracted into the channel 29 to return the opening 33 to position B opposite the inlet passageway 25 in readiness for formation of the next print.

For purposes of illustration, the pair of print formers 31 and 31a are not shown in the same positions in FIGURE 1. However, the print formers 31 and 31a may be reciprocated together.

The unit 11 illustrated is primarily adapted for use with a Morpac machine which provides the timed driving means for the print formers 31 and 31a and the ejector means. However, the principles of this invention are not limited to the use of a Morpac machine and other suitable packaging machines may be used.

There is provided in the print-forming section 17 of the main housing 13 a plurality of ports 39 opposite the opening 28 in the inlet passageway 25. As seen particularly in FIGURES 1, 2, and 5, the ports 39 are formed in a removable plate 41 mounted in the print forming section 17. These ports 39 provide means for the escape or bleeding-off of air from the opening 33 in the print former 31 while the opening is being filled with whipped plastic material.

It will be understood that the ports 39 also normally permit the flow of a small amount of whipped plastic material therethrough. However, by suitably regulating the size of the ports, the quantity of whipped plastic material which is allowed to flow out is minimized.

In the inlet passageway 25 of the feeding section 15 of the main housing 13, as seen particularly in FIGURES 2 and 5, there is provided a grid means, whereby the flow of whipped plastic material through the opening 28 into the print former 31 is divided into a plurality of streams. In the illustrated embodiment, the grid means comprises a grating 43 disposed in the outlet opening 28 of the inlet passageway 25. As seen particularly in FIGURE 3, the grating 43 includes a plate member 45 having dimensions somewhat greater than the cross section of the opening 28 from the inlet passageway 25. A generally rectangular aperture is provided in the plate member 45, having dimensions about equal to the dimensions of the opening 28 from the inlet passageway 25.

The grating 43 further includes bars 47 extending vertically across the aperture in the plate member 45. As seen particularly in FIGURES 4 and 5, each bar 47 has a generally triangular cross section having its apex extending toward the print former, and having a base dimension about equal to the thickness of the plate member 45 of the grating. In the illustrated embodiment, the base dimension of the bars is about 1/16 inch.

The grating 43 is suitably secured, by soldering or the like in a recessed portion 49 in the opening 28 of the feeding section 15. It will be seen in FIGURES 2 and 5 that the aperture in the plate member 45 of the grating 43 is aligned with the opening 33 of the print former 31 when in position B, whereby the flow of whipped plastic material is impeded only by the bars 49.

It has been discovered that, by providing grid means in accordance with the present invention, the whipped plastic material flows into the print former in such a way as to provide prints of consistently uniform weight and desirable appearance. In this connection, undesirable void regions in the print are avoided, which, as indicated above, have heretofore been a major problem. In accordance with the present invention, the variation in weight of the prints may consistently be held to less than about 3.5 percent.

The reasons for the improved performance obtained in accordance with the present invention are not fully understood. It is thought, however, that, partly because of their compressible nature, there has heretofore been a tendency for whipped plastic materials to immediately plug the ports 39 through which the air within the forming chamber should be bled off. For some reason which is not understood, dividing the flow of the whipped plastic material into a plurality of streams allows the ports 39 to function so that the air within the forming chamber escapes, and uniform print formation results. It is not thought that the improved results are obtained merely because the grid means provides additional resistance to flow of the whipped plastic material, since the provision of flow-restricting means alone does not provide the benefits enjoyed in accordance with the present invention. However, it should be understood that flow-dividing means having other configurations than that described herein may provide the desired results.

A particular feature of this invention is that uniform print formation is accomplished even though wide variations in pressure on the plastic material occur in the feeding section 15. Such variations occur in normal operations due to closing of the opening 28 when the print former is moved from position B to position A.

Thus, there has been provided a print-forming machine which is particularly adapted to handle whipped plastic materials, such as whipped butter and margarine. Moreover, the described mechanism is simple and economical in form and is readily dismantled for cleaning, servicing, and adjustment. The illustrated structure enables high speed production of prints of whipped plastic materials, while avoiding variations in weight and also avoiding the existence of void regions in the print.

Although shown and described with respect to particular apparatus and material, it will be apparent that various modifications might be made in the illustrated embodiment without departing from the principles of this invention. Such modifications are deemed to be within the scope of the claim.

Various features of the present invention are set forth in the following claim.

What is claimed is:

A print-forming unit for use with whipped plastic material, comprising a main housing, means defining an inlet passageway in said housing affording the introduction of whipped plastic material into the housing, means defining a channel in said housing disposed transversely of the inlet passageway at the end thereof, a print former in the channel comprising a member disposed therein for slidable movement relative thereto, said print former including an opening therethrough having dimensions of the print to be formed and positionable in fluid communication with the inlet passage, a plurality of gas bleeding and excess material discharge ports in said main housing at positions opposite the opening in said print former when the opening is disposed to receive material from the inlet passageway, and grid means disposed in the inlet passageway immediately adjacent the channel, whereby the flow of whipped plastic material into the opening in said print former is divided into a plurality of streams, said grid means comprising a plate member having a generally rectangular aperture formed therein having substantially the same dimensions as those of the print to be formed, and a plurality of bar members affixed to said plate member and extending across the aperture formed therein transversely of the inlet passageway, said bar members occupying about one-fourth of the area of the aperture.

References Cited in the file of this patent

UNITED STATES PATENTS

| | | |
|---|---|---|
| 2,090,404 | Parkhurst | Aug. 17, 1937 |
| 2,375,693 | Russell et al. | May 8, 1945 |
| 2,471,702 | Rapp et al. | May 31, 1949 |
| 2,732,587 | Greene | Jan. 31, 1956 |
| 2,916,986 | Lebovitz | Dec. 15, 1959 |
| 2,987,819 | Miller et al. | June 13, 1961 |